US 11,274,736 B2

(12) United States Patent
Tamura et al.

(10) Patent No.: US 11,274,736 B2
(45) Date of Patent: Mar. 15, 2022

(54) BENDING MESHING TYPE GEAR DEVICE (71) Applicant: SUMITOMO HEAVY INDUSTRIES, LTD., Tokyo (JP)

(72) Inventors: Mitsuhiro Tamura, Aichi (JP); Akira Yamamoto, Aichi (JP); Masahiro Watanabe, Aichi (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 849 days.

(21) Appl. No.: 15/914,335

(22) Filed: Mar. 7, 2018

(65) Prior Publication Data

US 2018/0266533 A1 Sep. 20, 2018

(30) Foreign Application Priority Data

Mar. 17, 2017 (JP) .............................. JP2017-052277

(51) Int. Cl.
*F16H 49/00* (2006.01)
*F16H 55/06* (2006.01)

(52) U.S. Cl.
CPC ........... *F16H 49/001* (2013.01); *F16H 55/06* (2013.01); *F16H 2049/003* (2013.01)

(58) Field of Classification Search
CPC .. F16H 49/001; F16H 2049/003; B64C 13/28
See application file for complete search history.

(56) References Cited

U.S. PATENT DOCUMENTS

| 5,061,227 A | * | 10/1991 | Fickelscher | ......... | F04C 15/0065 |
| | | | | | 475/170 |
| 2010/0288066 A1 | * | 11/2010 | Hirai | .................... | F16H 49/001 |
| | | | | | 74/416 |
| 2016/0245386 A1 | * | 8/2016 | Rossberger | ............ | B62M 23/00 |
| 2016/0305528 A1 | * | 10/2016 | Shahipassand | ....... | F16H 49/001 |
| 2018/0195433 A1 | | 7/2018 | Hiyoshi et al. | | |

(Continued)

FOREIGN PATENT DOCUMENTS

| CN | 103291851 A | 9/2013 |
| CN | 104832604 A | 8/2015 |

(Continued)

OTHER PUBLICATIONS

Office Action issued In Japanese Application No. 2020-188577, dated Jul. 6, 2021.

*Primary Examiner* — Terence Boes
(74) *Attorney, Agent, or Firm* — Michael Best & Friedrich LLP (57) ABSTRACT

A bending meshing type gear device includes a wave generator, an external gear which is bent and deformed by the wave generator, and internal gears which meshes with the external gear. One of the external gear and the internal gears is formed of a resin, and the other of the external gear and the internal gears is formed of a high thermal conductivity material having thermal conductivity higher than that of the resin. The gear device further include an abutment member which is connected to the internal gear and abuts the external gear, the internal gear is formed of the resin, the external gear is formed of the high thermal conductivity material, and the abutment member is formed of a high thermal conductivity material having thermal conductivity higher than that of the resin.

17 Claims, 6 Drawing Sheets

(56) References Cited

U.S. PATENT DOCUMENTS

| | | | | |
|---|---|---|---|---|
| 2019/0162271 | A1* | 5/2019 | Moritani | F16H 57/023 |
| 2019/0316653 | A1* | 10/2019 | Yoshida | F16C 19/28 |
| 2020/0072318 | A1* | 3/2020 | Shirouzu | F16H 1/32 |
| 2020/0200235 | A1* | 6/2020 | Yamamoto | F16H 1/32 |
| 2020/0325976 | A1* | 10/2020 | Tamura | F16H 1/10 |

FOREIGN PATENT DOCUMENTS

| | | |
|---|---|---|
| JP | S63-115944 A | 5/1988 |
| JP | 2005-188740 A | 7/2005 |
| JP | 2007-205450 A | 8/2007 |
| JP | 2013-170611 A | 9/2013 |
| JP | 2015-102110 A | 6/2015 |
| JP | 2015-148326 A | 8/2015 |
| WO | 2016-194511 A1 | 12/2016 |

* cited by examiner

BENDING MESHING TYPE GEAR DEVICE

RELATED APPLICATIONS

Priority is claimed to Japanese Patent Application No. 2017-052277, filed Mar. 17, 2017, the entire content of which is incorporated herein by reference.

BACKGROUND

Technical Field

Certain embodiments of the present invention relate to a bending meshing type gear device.

Description of Related Art

As a small gear device capable of obtaining a high reduction ratio, a bending meshing type gear device is known. In recent years, applications of the gear devices have been diversified, and thus, weight reduction may be required in this type of bending meshing type gear device. As a response of this requirement, in the related art, a bending meshing type gear device is disclosed, in which an internal gear and an external gear are formed of a resin.

SUMMARY

According to an embodiment of the present invention, there is provided A bending meshing type gear device, including: a wave generator; an external gear which is bent and deformed by the wave generator; and an internal gear which meshes with the external gear, in which one of the external gear and the internal gear is formed of a resin, and the other of the external gear and the internal gear is formed of a high thermal conductivity material having thermal conductivity higher than that of the resin.

DETAILED DESCRIPTION

Meanwhile, if a gear is formed of a resin, in a case where heat is generated in a meshing location of the gear, there is a concern that a life-span of the gear may decrease due to influences of thermal deterioration. A bending meshing type gear device having a countermeasure with respect to the thermal deterioration has not been proposed yet, and thus, the proposal is desired.

It is desirable to provide a bending meshing type gear device capable of taking a countermeasure with respect to the heat generation in the gear while achieving weight reduction.

According to the bending meshing type gear device of the present invention, it is possible to take a countermeasure with respect to heat generation in the gear while achieving weight reduction.

Hereinafter, in embodiments and modification examples, the same reference numerals are assigned to the same components, and overlapping descriptions thereof are omitted. In addition, in each drawing, for convenience of explanation, some components are appropriately omitted, or dimensions of the components are appropriately enlarged or reduced. Moreover, for separate components having common points, "first", "second", or the like is appended at the beginning of each name and "-A, -B" or the like is appended at the end of the reference numeral to distinguish the components, and when the components are collectively referred, these are omitted.

First Embodiment

Figure 1:
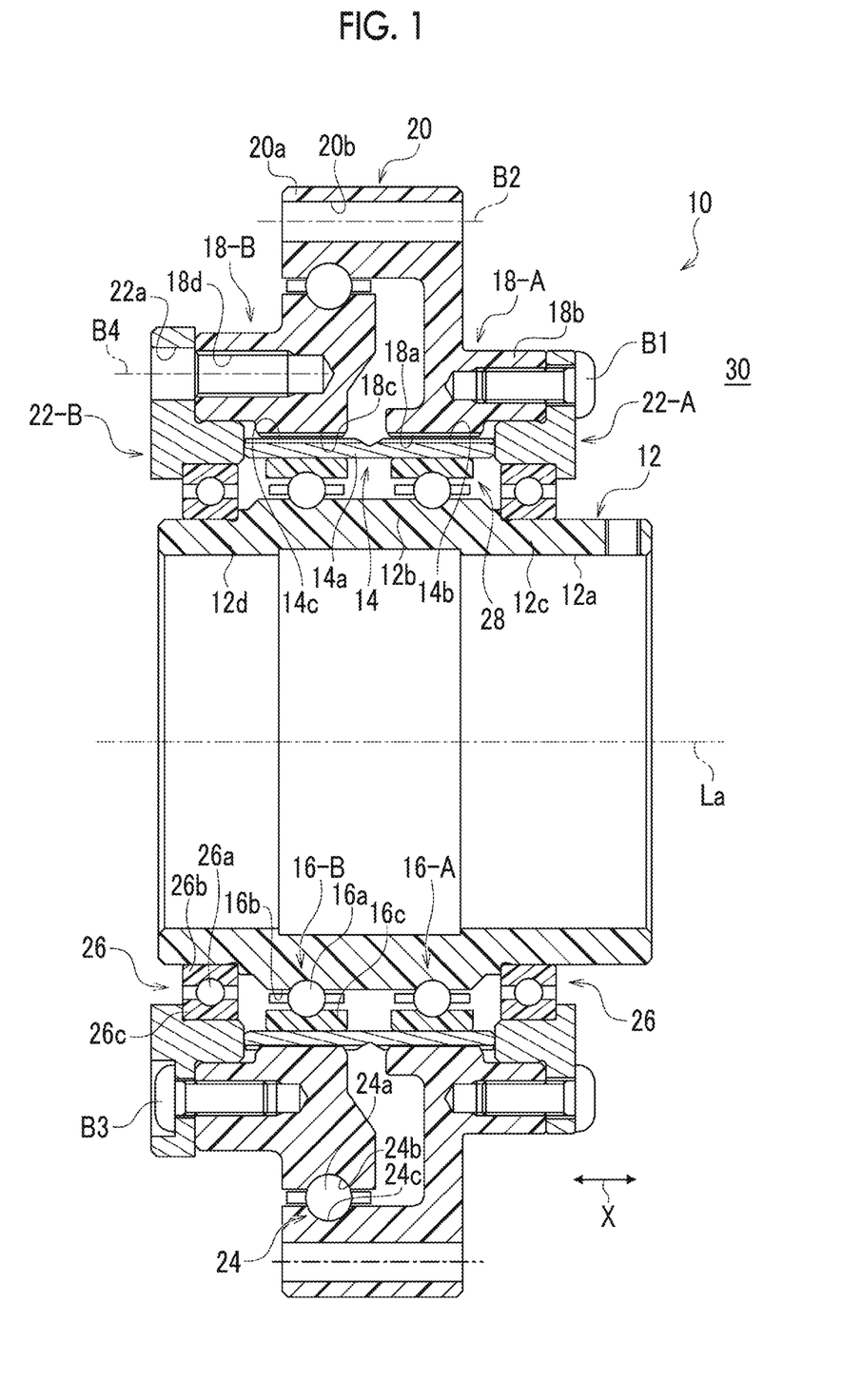
FIG. 1 is a side sectional view showing a gear device of a first embodiment.

FIG. 1 is a side sectional view showing a gear device 10 of a first embodiment. The gear device 10 is a bending meshing type gear device which rotates an external gear 14 meshing with internal gears 18-A and 18-B while bending and deforming the external gear 14 so as to rotate the external gear 14 and outputs the rotation component. The gear device of the present embodiment is a so-called tubular bending meshing type gear device which decelerates a rotation of a wave generator 12 and outputs the decelerated rotation using the decelerating internal gear 18-A and the output internal gear 18-B.

The gear device 10 mainly includes the wave generator 12, the external gear 14, wave generator bearings 16-A and 16-B, the internal gears 18-A and 18-B, a support member 20, and bearing housings 22-A and 22-B. Hereinafter, a direction along a rotation center line La of the wave generator 12 is simply referred to as an "axial direction X", a circumferential direction around the rotation center line La may be simply referred to as a "circumferential direction", and a radial direction around the rotation center line La may be simply referred to as a radial direction.

The wave generator 12 is a tubular member having stiffness. A drive shaft (not shown) of a drive device such as a motor is connected to the wave generator 12 using a key or the like. A shaft hole 12a into which a wire or the like is inserted is formed on an inner peripheral side of the wave generator 12. The wave generator 12 is rotated by the drive shaft with the axis of the wave generator 12 as a rotation center. In addition, the drive device is disposed on one side (right side in FIG. 1) in the axial direction X from the wave generator 12. Hereinafter, the one side in the axial direction X is referred to as an input side and the other side (left side in FIG. 1) is referred to as a counter input side.

The wave generator 12 includes an intermediate shaft portion 12b, an input-side shaft portion 12c which is positioned on the input side from the intermediate shaft portion 12b, and a counter input-side shaft portion 12d which is positioned on the counter input side from the intermediate shaft portion 12b. An outer peripheral shape of the intermediate shaft portion 12b in a cross section orthogonal to the axial direction X has an elliptical shape. An outer peripheral shape of each of the input-side shaft portion 12c and the counter input-side shaft portion 12d in the cross section orthogonal to the axial direction X has a circular shape. In the present specification, the "elliptical shape" is not limited to a geometrically exact elliptical shape but includes an approximately elliptical shape.

The external gear 14 is disposed on an outer peripheral side of the intermediate shaft portion 12b of the wave generator 12. The external gear 14 is a tubular member having flexibility. The external gear 14 includes a tubular base portion 14a and a first external tooth portion 14b and a second external tooth portion 14c which are integrally formed with the base portion 14a on an outer peripheral side of the base portion 14a. The first external tooth portion 14b is disposed on the input side in the axial direction X and meshes with the decelerating internal gear 18-A described later. The second external tooth portion 14c is disposed on the counter input side in the axial direction X and meshes with the output internal gear 18-B described later. In the first external tooth portion 14b and the second external tooth portion 14c, both portions of the intermediate shaft portion 12b of the wave generator 12 in a longitudinal direction mesh with the internal gear 18.

When the wave generator 12 rotates, the external gear 14 is bent and deformed elliptically via a wave generator bearing 16 by the intermediate shaft portion 12b of the wave generator 12. In this case, the external gear 14 is bent and deformed so as to match the shape of the intermediate shaft portion 12b of the wave generator 12 while changing a meshing position with the internal gear 18-A in the circumferential direction.

The wave generator bearing 16 is disposed between the intermediate shaft portion 12b of the wave generator 12 and the external gear 14. The wave generator bearing 16 includes a first wave generator bearing 16-A which is disposed between the first external tooth portion 14b of the external gear 14 and the wave generator 12, and a second wave generator bearing 16-B which is disposed between the second external tooth portion 14c of the external gear 14 and the wave generator 12. The wave generator 12 rotatably supports the external gear 14 via the wave generator bearing 16.

Each of the wave generator bearings 16 includes a plurality of first rolling bodies 16a, a first inner ring 16b, and a second outer ring 16c. Each of the first rolling bodies 16a of the present embodiment has a spherical body. However, the first rolling body 16a may have a roller or the like. The first inner ring 16b of the present embodiment configures an outer peripheral surface of the intermediate shaft portion 12b of the wave generator 12. However, the first inner ring 16b may be configured of a member separated from the wave generator 12. The first outer ring 16c has flexibility. When the wave generator 12 rotates, the first outer ring 16c is bent and deformed elliptically via the first rolling bodies 16a by the intermediate shaft portion 12b of the wave generator 12.

The internal gear 18 is an annular member having stiffness. The internal gear 18 is disposed on the outer peripheral side of the first external tooth portion 14b or the second external tooth portion 14c of the external gear 14. The internal gear 18 of the present embodiment includes a decelerating internal gear 18-A (first internal gear) which is disposed on the input side in the axial direction X and an output internal gear 18-B (second internal gear) which is disposed on the counter input side in the axial direction X.

The decelerating internal gear 18-A includes a first internal tooth portion 18a which meshes with the first external tooth portion 14b of the external gear 14. The number of internal teeth of the first internal tooth portion 18a is larger than the number of external teeth of the first external tooth portion 14b by 2i (i is a natural number of one or more). Accordingly, when the wave generator 12 rotates, the rotation of the wave generator 12 is decelerated by a reduction ratio corresponding to a difference in the numbers of teeth between the first internal tooth portion 18a and the first external tooth portion 14b, and the external gear 14 rotates. In addition, the decelerating internal gear 18-A includes a connecting portion 18b in which a bolt hole into which a bolt B1 is screwed is formed. The bolt B1 is used to connect the decelerating internal gear 18-A to the input-side bearing housing 22-A.

The output internal gear 18-B includes a second internal tooth portion 18c which meshes with the second external tooth portion 14c of the external gear 14. The number of the internal teeth of the second internal tooth portion 18c is the same as the number of the external teeth of the second external tooth portion 14c. Accordingly, when the wave generator 12 rotates, a rotation having the same magnitude as that of a rotation component of the external gear 14 is output to the output internal gear 18-B.

The support member 20 includes an outer tubular portion 20a which rotatably supports the output internal gear 18-B via a main bearing 24. The outer tubular portion 20a is disposed radially outside the first internal tooth portion 18a of the decelerating internal gear 18-A. In the present embodiment, the support member 20 and the decelerating internal gear 18-A configure a portion of a single member and are integrated with each other. In the outer tubular portion 20a, an insertion hole 20b into which a bolt B2 used to connect the outer tubular portion 20a to an external member is inserted is formed. The external member is disposed outside the gear device 10 and has the role of supporting the gear device 10.

The main bearing 24 includes a plurality of second rolling bodies 24a, a second inner ring 24b, and a second outer ring 24c. Each of the second rolling bodies 24a of the present embodiment has a spherical body. However the second rolling body 24a may have a roller or the like. The second inner ring 24b of the present embodiment configures an outer peripheral surface of the output internal gear 18-B. However, the second inner ring 24b may be configured of a member separated from the output internal gear 18-B. The second outer ring 24c configures an inner peripheral surface of the outer tubular portion 20a of the support member 20. However, the second inner ring 24b may be configured of a member separated from the support member 20.

The bearing housing 22 is disposed away from the wave generator 12 in the axial direction X. The bearing housing 22 includes the input-side bearing housing 22-A which is disposed on the input side in the axial direction X and a counter input-side bearing housing 22-B which is disposed on the counter input side in the axial direction X.

The input-side bearing housing 22-A is connected to the decelerating internal gear 18-A by the bolt B1 so as to be integrated with the decelerating internal gear 18-A. The input-side bearing housing 22-A is connected to the decelerating internal gear 18-A and functions as a first abutment member which abuts an input-side end surface of the external gear 14.

The counter input-side bearing housing 22-B is connected to the output internal gear 18-B by a bolt B3 so as to be integrated with the output internal gear 18-B. The counter input-side bearing housing 22-B is connected to the output internal gear 18-B and functions as a second abutment member which abuts a counter input-side end surface of the external gear 14.

A bearing 26 is disposed between the input-side bearing housing 22-A and the input-side shaft portion 12c of the wave generator 12 or between the counter input-side bearing housing 22-B and the counter input-side shaft portion 12d of the wave generator 12. The pair of bearing housings 22-A and 22-B rotatably supports the wave generator 12 on both sides via the bearings 26. Each bearing 26 includes a plurality of third rolling bodies 26a, a third inner ring 26b, and a third outer ring 26c.

The counter input-side bearing housing 22-B and the output internal gear 18-B are connected to a driven device via a bolt B4. The driven device is disposed on the counter input side from the wave generator 12 in the axial direction X. In the counter input-side bearing housing 22-B, an insertion hole 22a into which a shaft portion of the bolt B4 is inserted is formed. In the output internal gear 18-B, a female screw hole 18d into which the bolt B4 is screwed is formed.

An operation of the above-described gear device 10 will be described.

If the drive shaft of the drive device rotates, the wave generator 12 rotates together with the drive shaft. If the wave generator 12 rotates, the external gear 14 is bent and deformed continuously to match the shape of the intermediate shaft portion 12b of the wave generator 12 while changing the meshing position with the internal gear 18 in the circumferential direction. Each time the wave generator 12 rotates once, the first external tooth portion 14b rotates relative to the decelerating internal gear 18-A by an amount corresponding to the difference in the number of teeth between the first internal tooth portion 18a of the decelerating internal gear 18-A and the first external tooth portion 14b. In this case, the rotation of the wave generator 12 is decelerated by the reduction ratio corresponding to the difference in the number of teeth between the first internal tooth portion 18a and the first external tooth portion 14b, and the external gear 14 rotates. The number of teeth of the second internal tooth portion 18c of the output internal gear 18-B and the number of teeth of the second external tooth portion 14c are the same as each other. Therefore, the output internal gear 18-B synchronously rotates with the same rotation component as that of the second external tooth portion 14c while the relative meshing position to the second external tooth portion 14c is not changed before and after the wave generator 12 rotates once. The rotation of the output internal gear 18-B is transmitted from the output internal gear 18-B to the driven device. As a result, the rotation of the wave generator 12 is decelerated and is output from the output internal gear 18-B to the driven device.

Here, the gear device 10 of the first embodiment has the following features. That is, some of the above-described components are formed of a resin, and the other components are formed of a high thermal conductivity material described later.

Specifically, in the gear device 10 of the first embodiment, one of the external gear 14 and the internal gear 18 is formed of a resin. In the present embodiment, the internal gear 18 is formed of a resin. More specifically, each of the decelerating internal gear 18-A and the output internal gear 18-B is formed of a resin. Herein, for the sake of convenience, the resin forming one of the external gear 14 and the internal gear 18 is referred to as a resin for gear. Here, for example, the resin for gear includes a general purpose engineering plastics such as polyacetal or polyamide.

Moreover, the external gear 14 which is the other of the external gear 14 and the internal gear 18 is formed of the high thermal conductivity material. Specifically, the entire external gear 14, that is, each of the base portion 14a, the first external tooth portion 14b, and the second external tooth portion 14c is formed of the high thermal conductivity material. This high thermal conductivity material has thermal conductivity [W/(m·K)] higher than that of the resin for gear. In the present embodiment, a metal such as steel or aluminum is used as the high thermal conductivity material. However, other resins or the like having thermal conductivity larger than that of the resin for gear may be used as the high thermal conductivity material.

(A) Accordingly, when the meshing location between the internal gear 18 and the external gear 14 is heated, heat transfer from the meshing location to other locations through the external gear 14 formed of the high thermal conductivity material is promoted, and heat dissipation in the other locations is promoted. Here, the other locations include not only locations other than the meshing location of the external gear 14 but also a member (the bearing housing 22 in the present embodiment) other than the external gear 14. Accordingly, it is possible to suppress an increase in temperature of the internal gear 18 or the external gear 14 caused by heat generation in the meshing location between the internal gear 18 and the external gear 14. As a result, it is possible to prevent a decrease in life-span of the internal gear 18 or the external gear 14 due to influences of thermal deterioration, and favorable durability of the internal gear 18 or the external gear 14 can be obtained. Accordingly, one of the external gear 14 and the internal gear 18 is formed of the resin for gear, and thus, it is possible to take a countermeasure with respect to heat generation in the gear while achieving weight reduction.

From the viewpoint of transferring heat generated in the meshing location of the gear to the other locations, it is preferable that the high thermal conductivity material has the thermal conductivity larger than that of the resin for gear. From this viewpoint, for example, it is preferable that the thermal conductivity of the high thermal conductivity material is set to be 10.0 times or more the thermal conductivity of the resin for gear.

In the bending meshing type gear device 10, in general, an internal gear 18 which is disposed on an outer peripheral side of the external gear 14 has a volume larger than that of the external gear 14. Compared to a case where the external gear 14 having a smaller volume is formed of the resin for gear, in the present embodiment, the internal gear 18 having a larger volume is formed of the resin for gear, and thus, it is possible to effectively achieve the weight reduction.

Meanwhile, an accommodation space 28 in which the external gear 14 is accommodated is formed between the internal gear 18 and the external gear 14 and is positioned at a deep location away from an external space 30 around the gear device 10. Accordingly, air does not easily flow between the accommodation space 28 of the external gear 14 and the external space 30, and heat dissipated from the external gear 14 is easily collected in the accommodation space 28. Particularly, the accommodation space 28 is formed at the location interposed between both sides in the axial direction X by the bearing housing 22 or the bearings 26, and heat is more easily collected in the accommodation space 28. Next, a method for promoting the heat dissipation of the external gear 14 positioned at the location where the heat is easily collected will be described.

As described above, the input-side bearing housing 22-A or the counter input-side bearing housing 22-B functions as the abutment member which abuts the external gear 14. A portion of the bearing housing 22 is exposed to the external space 30. Here, for example, the portion is a surface of the bearing housing 22 facing the outside in the axial direction X and the outer peripheral surface of the bearing housing 22 facing the outside in the radial direction. The bearing housing 22 is formed of the high thermal conductivity material having the thermal conductivity higher than that of the above-described resin for gear. In the present embodiment, a metal having the same thermal conductivity as that of the external gear 14 is used as the high thermal conductivity material. However, a specific example of the high thermal conductivity material is not particularly limited as long as it has the thermal conductivity larger than that of the resin for gear. For example, the bearing housing 22 may be formed of a material different from that of the external gear 14.

Accordingly, the heat of the external gear 14 can be transferred to the bearing housing 22 which abuts the external gear 14, and the heat of the external gear 14 can be dissipated from the bearing housing 22. Accordingly, the dissipation locations of the heat generated at the meshing location of the gear increase, and thus, it is possible to suppress the increase in temperature of the internal gear 18 or the external gear 14. Particularly, heat can be dissipated from the bearing housing 22 to the external space 30 around the bearing housing 22, the heat dissipation from the external gear 14 disposed in the accommodation space 28 to the external space 30 is promoted, and thus, it is possible to effectively suppress the increase in temperature of the internal gear 18 or the external gear 14.

Moreover, in the gear device 10 of the present embodiment, in order to achieve the weight reduction, each of the first outer ring 16c of the wave generator bearing 16, the third outer ring 26c and the third inner ring 26b of the bearing 26, and the wave generator 12 is formed of a resin. These may be formed of the resin of gear having the same thermal conductivity as that of the internal gear 18 or may be formed of other resins. The first rolling bodies 16a of the wave generator bearing 16, the second rolling bodies 24a of the main bearing 24, and the third rolling bodies 26a of the bearing 26 are formed of a metal. This is because required strength of the rolling bodies of the bearings is larger than that of the outer rings or the inner rings thereof.

Moreover, the support member 20 configures a portion of the single member which is the same as that of the decelerating internal gear 18-A, and thus, similarly to the decelerating internal gear 18-A, the support member 20 is formed of the resin for gear.

In addition, the gear device 10 of the present embodiment includes the bolts B1 and B3 which connect a member formed of a resin and another member to each other. Here, in the present embodiment, a combination of the "member formed of a resin" and "another member" is a combination of the decelerating internal gear 18-A and the input-side bearing housing 22-A and a combination of the output internal gear 18-B and the counter input-side bearing housing 22-B.

Similarly to the external gear 14 or the like, the bolts B1 and B3 are formed of a metal as the high thermal conductivity material. Accordingly, even in a member formed of the resin having a small heat dissipation amount, the heat dissipation can be promoted through the bolts B1 and B3 formed of the high thermal conductivity material, and thus, thermal deterioration of the member can be suppressed. Moreover, in the present embodiment, from the viewpoint of promoting the heat transfer and the heat dissipation, the example in which "another member" is formed of the high thermal conductivity material is described. However, "another member" may be formed of the resin for gear.

Second Embodiment

Figure 2:
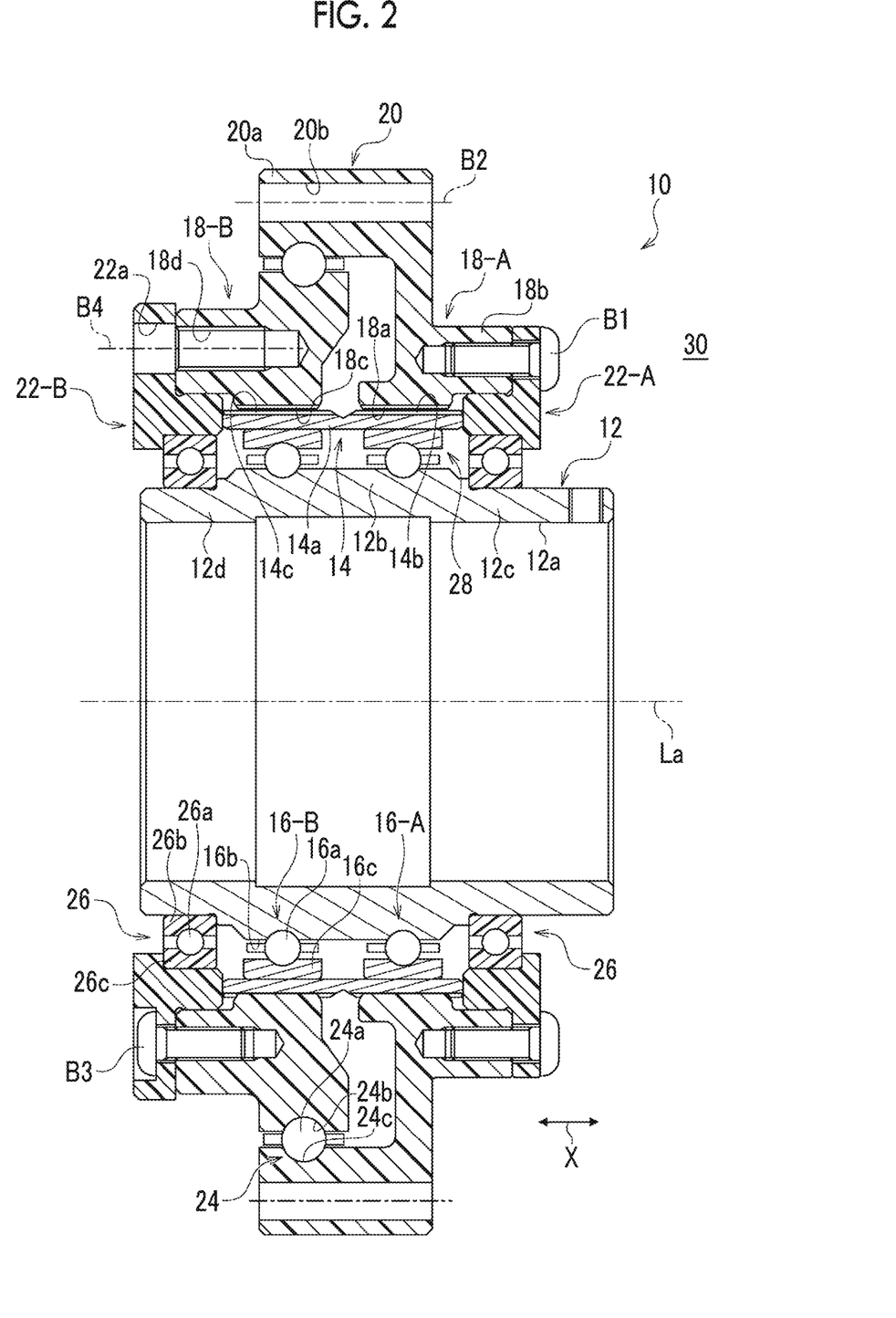
FIG. 2 is a side sectional view showing a gear device of a second embodiment.

FIG. 2 is a side sectional view showing a gear device 10 of a second embodiment. In the present embodiment, another method for promoting the heat dissipation of the external gear 14 positioned at the location at which heat is easily collected will be described. In the first embodiment, as this method, the example in which the bearing housing 22 is formed of the high thermal conductivity material is described. In the present embodiment, in order to realize this method, not only the bearing housing 22 but also the wave generator 12 and the wave generator bearing 16 are formed of the high thermal conductivity material.

Specifically, in the present embodiment, each of the first rolling bodies 16a and the first outer ring 16c of the wave generator bearing 16 and the wave generator 12 are formed of a metal as the high thermal conductivity material. In a case where the wave generator bearing 16 has the first inner ring 16b separated from the wave generator 12, the first inner ring 16b is also formed of the high thermal conductivity material. In the present embodiment, the metal having the same thermal conductivity as that of the external gear 14 is used as the high thermal conductivity material. However, the specific example thereof is not particularly limited as long as it has the thermal conductivity larger than that of the resin for gear. For example, the wave generator 12 and the wave generator bearing 16 may be formed of a material different from that of the external gear 14.

In addition, a portion of the wave generator 12 is exposed to the external space 30. Here, the portion includes outer peripheral surfaces of both end portions of the wave generator 12 in the axial direction X, an end surface thereof facing the outside in the axial direction X, or the like.

According to this configuration, the heat of the external gear 14 can be transferred to the wave generator 12 through the wave generator bearing 16 which abuts the external gear 14, and the heat of the external gear 14 can be dissipated from the wave generator bearing 16 or the wave generator 12. Therefore, the dissipation locations of the heat generated at the meshing location of the gear increase, and thus, it is possible to suppress the increase in temperature of the internal gear 18 or the external gear 14. Particularly, heat can be dissipated from the wave generator 12 to the external space 30 around the wave generator 12, and heat can be dissipated from the wave generator 12 to the drive shaft of the drive device connected to the wave generator 12. Accordingly, the heat dissipation from the external gear 14 disposed in the accommodation space 28 to the external space 30 or the drive shaft is promoted, and thus, it is possible to effectively suppress the increase in temperature of the internal gear 18 or the external gear 14.

In addition, the wave generator 12 is formed of a metal, and thus, following advantages are obtained. In general, the wave generator 12 tends to have a large outer diameter, a large load is easily applied to the wave generator 12 as a bending moment increase, and required strength thereof tends to be increased. With respect to this, compared to a case where the wave generator 12 is formed of the resin for gear, since the wave generator 12 is formed of a metal, the required strength of the wave generator 12 is easily obtained. Therefore, it is possible to easily secure the required strength of the wave generator 12 while achieving the weight reduction of the gear device 10 or taking the countermeasure with respect to the heat generation in the gear.

Similarly to the first embodiment, in the present embodiment, one of the external gear 14 and the internal gear 18 is formed of the resin for gear, and thus, it is possible to take the countermeasure with respect to the heat generation in the gear while achieving the weight reduction.

Moreover, in the present embodiment, the bearing housing 22 is formed of the resin for gear. However, similarly to the first embodiment, the bearing housing 22 may be formed of the high thermal conductivity material. In addition, in the present embodiment, other components such as the external gear 14, the internal gear 18, the main bearing 24, or the bearing 26 are formed of materials similar to those of the first embodiment. That is, the external gear 14, the second rolling bodies 24a of the main bearing 24, and the third rolling bodies 26a of the bearing 26 are formed of a metal as the high thermal conductivity material, and the internal gear 18 and the third outer ring 26c and the third inner ring 26b of the bearing 26 are formed of the resin for gear.

Third Embodiment

Figure 3:
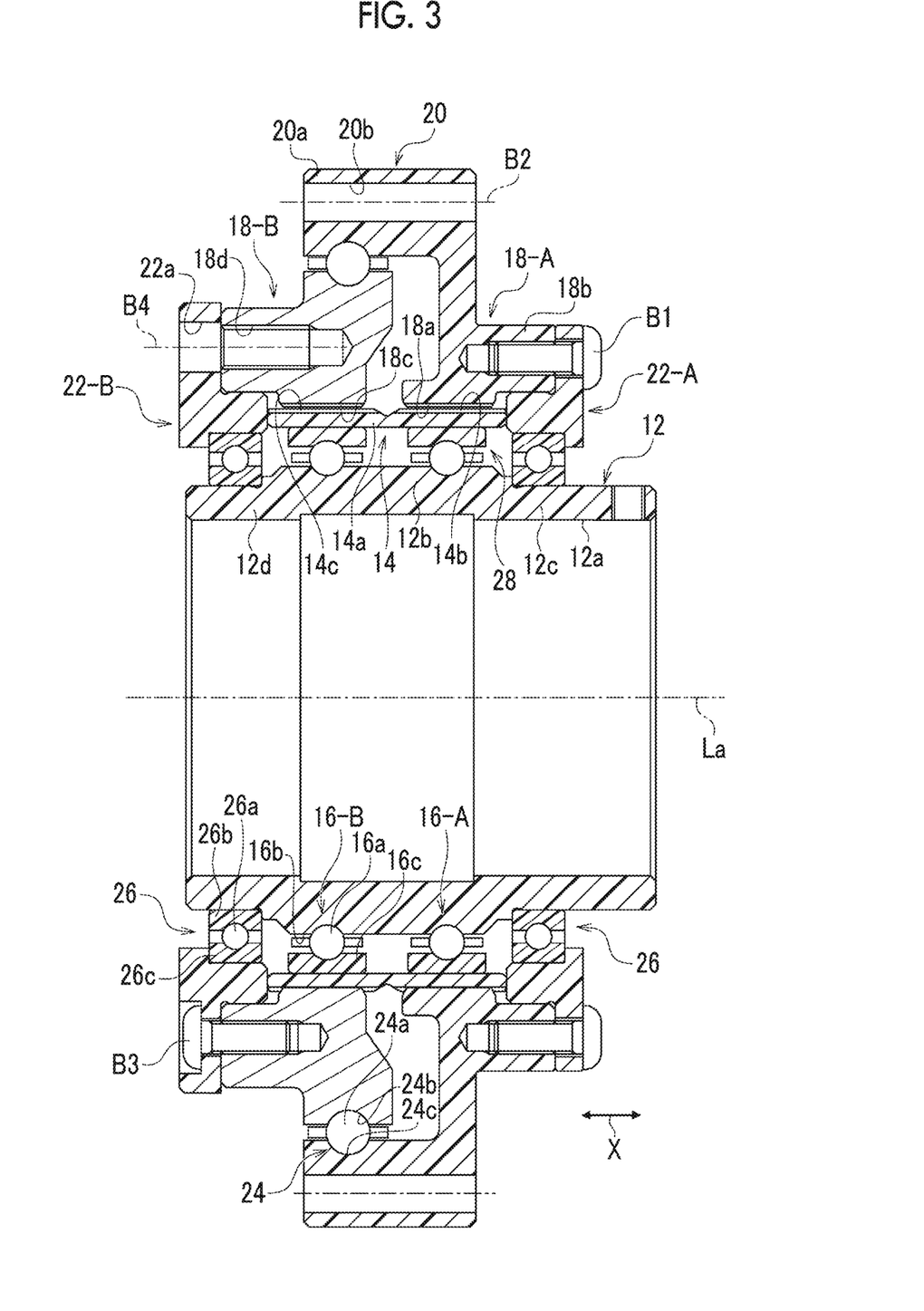
FIG. 3 is a side sectional view showing a gear device of a third embodiment.

FIG. 3 is a side sectional view showing a gear device 10 of a third embodiment. In the first and second embodiments, the example in which the external gear 14 is formed of the high thermal conductivity material and the internal gear 18 is formed of the resin for gear is described. In the present embodiment, the external gear 14 is formed of the resin for gear and the internal gear 18 is formed of the high thermal conductivity material. Specifically, in the internal gear 18, the output internal gear 18-B is formed of the high thermal conductivity material and the decelerating internal gear 18-A is formed of the resin for gear.

In the present embodiment, when the meshing location between the internal gear 18 and the external gear 14 is heated, heat transfer from the meshing location to other locations through the output internal gear 18-B formed of the high thermal conductivity material is promoted, and heat dissipation in the other locations is promoted. Here, the other locations include the locations other than the meshing location of the output internal gear 18-B. Accordingly, similarly to the contents described in the above (A), it is possible to suppress an increase in temperatures of the output internal gear 18-B and the external gear 14 caused by heat generation in the meshing location between the output internal gear 18-B and the external gear 14. As a result, it is possible to prevent a decrease in life-span of the output internal gear 18-B or the external gear 14 due to influences of thermal deterioration, and favorable durability of the output internal gear 18-B or the external gear 14 can be obtained. Accordingly, one of the external gear 14 and the internal gear 18 is formed of the resin for gear, and thus, it is possible to take a countermeasure with respect to heat generation in the gear while achieving weight reduction.

In addition, since the output internal gear 18-B is formed of a metal as the high thermal conductivity material, the following advantages are obtained. The output internal gear 18-B is connected to the driven device, and thus, a bending moment may be applied from the driven device to the output internal gear 18-B to be inclined to the rotation center line La. According to this, a large load is easily applied to the meshing location between the output internal gear 18-B and the external gear 14 or the rolling surface of the main bearing 24, and the required strength easily increases. With respect to this, since the output internal gear 18-B is formed of a metal, compared to a case where the output internal gear 18-B is formed of the resin for gear, the required strength of the output internal gear 18-B is easily secured. Therefore, it is possible to easily secure the required strength of the output internal gear 18-B while achieving the weight reduction of the gear device 10 or taking the countermeasure with respect to the heat generation in the gear.

Moreover, in the gear device 10 of the present embodiment, in order to achieve the weight reduction, each of the first outer ring 16c of the wave generator bearing 16, the third outer ring 26c and the third inner ring 26b of the bearing 26, the wave generator 12, and the bearing housing 22 is formed of a resin. These may be formed of the resin for gear having the same thermal conductivity as that of the external gear 14 or may be formed of other resins. The first rolling bodies 16a of the wave generator bearing 16, the second rolling bodies 24a of the main bearing 24, and the third rolling bodies 26a of the bearing 26 are formed of a metal. This is because the rolling bodies of the bearing need the required strength larger than that of other locations. In addition, similarly to the first and second embodiments, the bolts B1 and B3 of the present embodiment are formed of a metal as the high thermal conductivity material.

In the present embodiment, the example is described, in which only the output internal gear 18-B is formed of the high thermal conductivity material and the decelerating internal gear 18-A is formed of the resin for gear. Moreover, both the decelerating internal gear 18-A and the output internal gear 18-B may be formed of the high thermal conductivity material, or only the decelerating internal gear 18-A may be formed of the high thermal conductivity material. In any case, the external gear 14 is formed of the resin for gear.

Moreover, in the present embodiment, the example is described in which the wave generator 12, the first outer ring 16c of the wave generator bearing 16, and the bearing housing 22 are formed of a resin while the internal gear 18 is formed of the high thermal conductivity material. In this way, in a case where the internal gear 18 is formed of the high thermal conductivity material, the wave generator 12, the wave generator bearing 16, and the bearing housing 22 are formed of the high thermal conductivity material, specifically, a metal.

Fourth Embodiment

Figure 4:
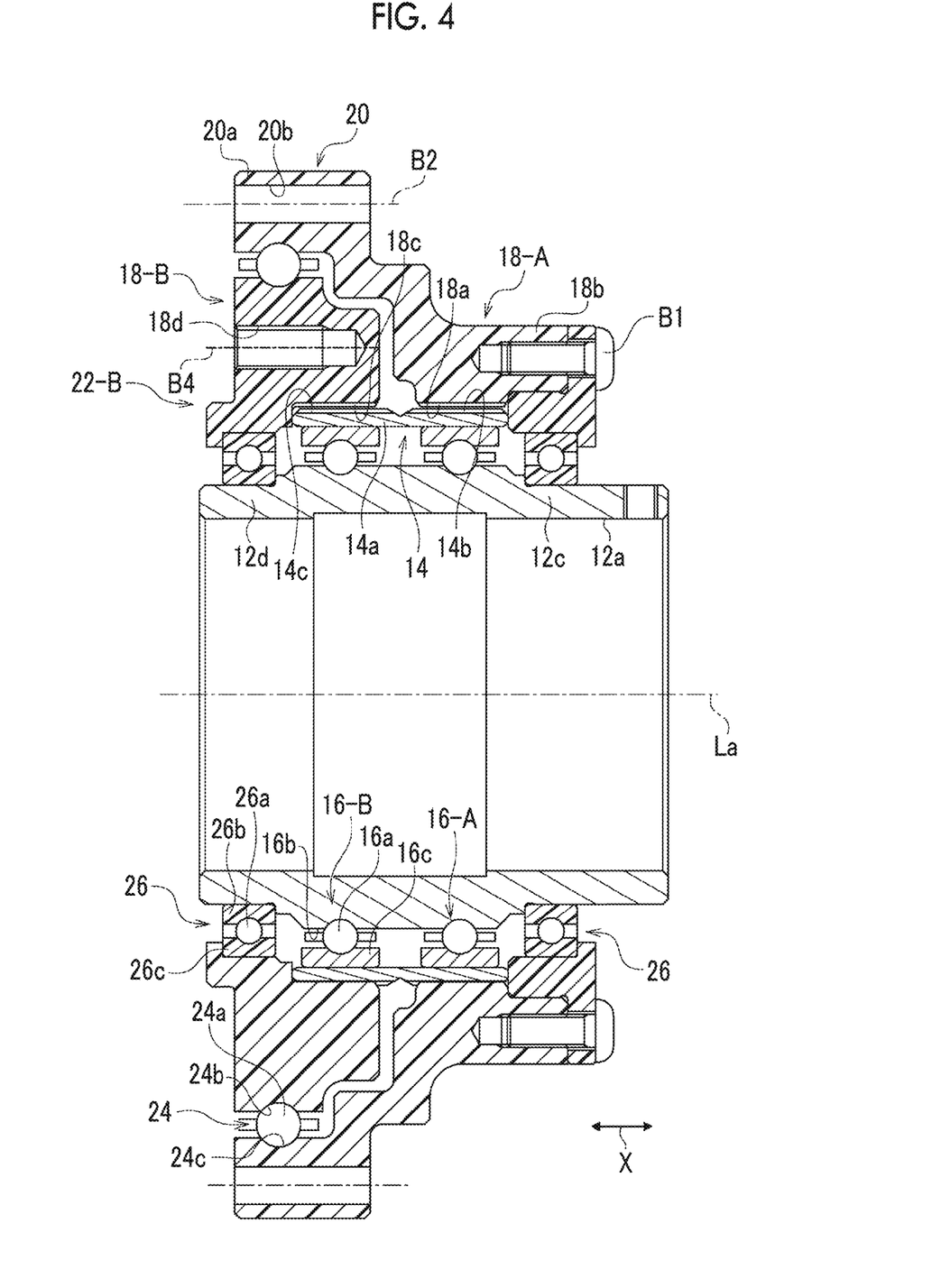
FIG. 4 is a side sectional view showing a gear device of a fourth embodiment.

FIG. 4 is a side sectional view showing a gear device 10 of a fourth embodiment. In the examples of FIGS. 1 to 3, the example in which the counter input-side bearing housing 22-B and the output internal gear 18-B are separated from each other is described.

In the counter input-side bearing housing 22-B of the present embodiment, the counter input-side bearing housing 22-B configures a portion of the same member as that of the output internal gear 18-B, the counter input-side bearing housing 22-B and the output internal gear 18-B are integrated with each other. This means that the output internal gear 18-B also functions as the bearing housing 22. The output internal gear 18-B functioning as the bearing housing 22 is formed of the resin for gear.

Except for the above-described matter, the combination of the resin for gear and the high thermal conductivity material is the same as that of the second embodiment. That is, the wave generator 12, the external gear 14, the first rolling bodies 16a of the wave generator bearing 16, the second rolling bodies 24a of the main bearing 24, and the third rolling bodies 26a of the bearing 26 are formed of a metal as the high thermal conductivity material. The input-side bearing housing 22-A, the decelerating internal gear 18-A, the first outer ring 16c of the wave generator bearing 16, and the third outer ring 26c and the third inner ring 26b of the bearing 26 are formed of a resin.

Similarly to other embodiments, in the present embodiment, one of the external gear 14 and the internal gear 18 is formed of the resin for gear, and thus, it is possible to take a countermeasure with respect to heat generation in the gear while achieving weight reduction.

Fifth Embodiment

Figure 5:
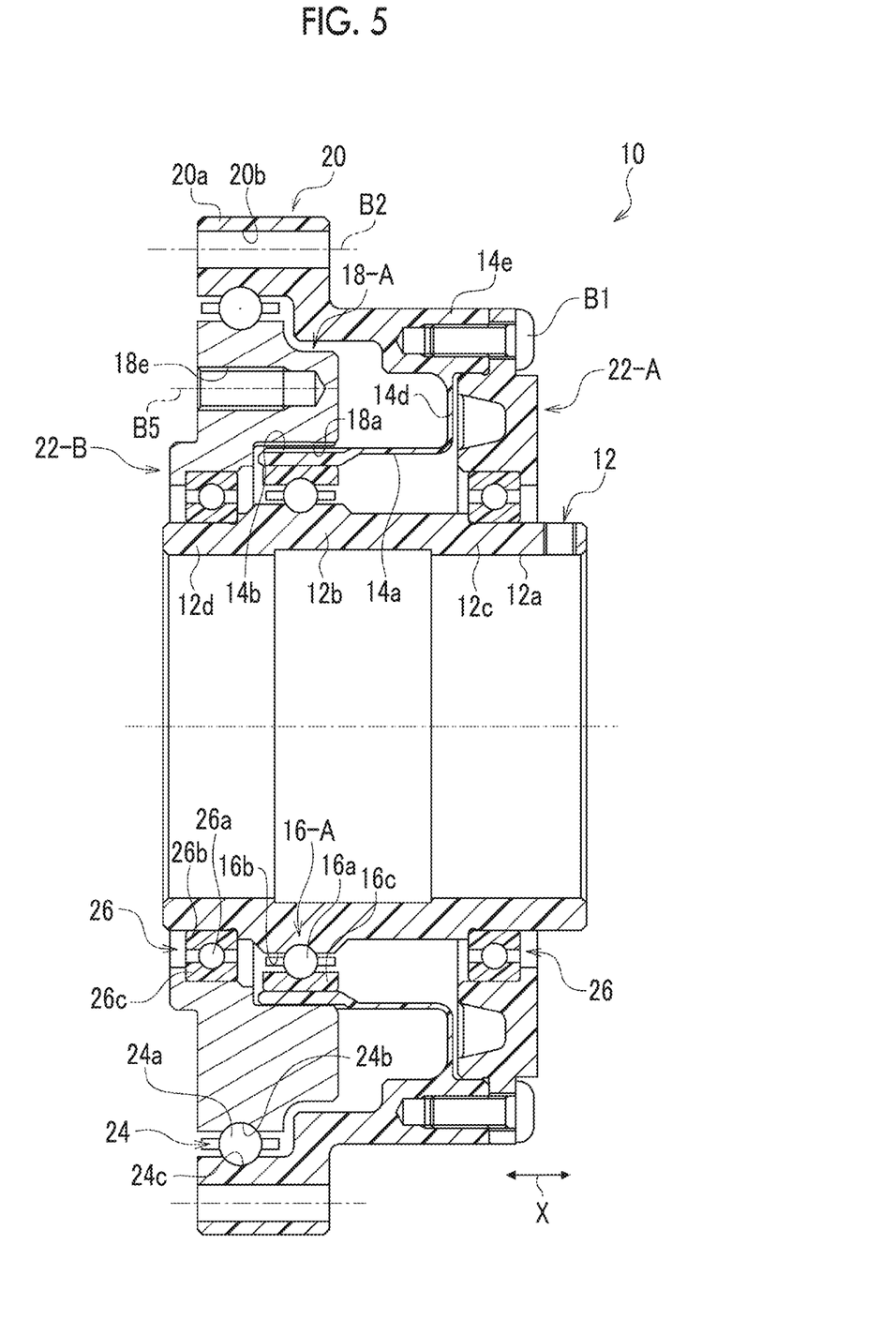
FIG. 5 is a side sectional view showing a gear device of a fifth embodiment.

FIG. 5 is a side sectional view showing a gear device 10 of a fifth embodiment. In the first to fourth embodiments, the tubular bending meshing type gear device is described. In the present embodiment, a so-called silk hat type bending meshing reduction gear is described, in which the rotation of the wave generator 12 is decelerated by using only one decelerating internal gear 18-A without using the output internal gear 18-B and the decelerated rotation is output.

The external gear 14 includes the tubular base portion 14a and a flange portion 14d which extends from an input side end portion of the base portion 14a to the outside in the radial direction. The base portion 14a of the external gear 14 and the flange portion 14d forma silk hat shape. The counter input side of the base portion 14a is formed to be thicker than the input side portion of the base portion 14a. The external gear 14 has the first external tooth portion 14b, which is integrally formed with the base portion 14a, on outer peripheral side of the counter input side portion of the base portion 14a.

The external gear 14 has a connecting portion 14e in which a bolt hole into which the bolt B1 is screwed is formed. The bolt B1 is used to connect the external gear 14 to the input-side bearing housing 22-A. The connecting portion 14e is provided radially outside the flange portion 14d.

The external gear 14 is integrated with the support member 20 having the outer tubular portion 20a which rotatably supports the decelerating internal gear 18-A via the main bearing 24. In the present embodiment, the support member 20 and the external gear 14 configure a portion of a single member and are integrated with each other.

Similarly to the first embodiment, the decelerating internal gear 18-A is an annular member having stiffness. The decelerating internal gear 18-A is disposed on the outer peripheral side of the first external tooth portion 14b of the external gear 14. The decelerating internal gear 18-A includes the first internal tooth portion 18a which meshes with the first external tooth portion 14b of the external gear 14. Similarly to the first embodiment, the number of internal teeth of the first internal tooth portion 18a is larger than the number of external teeth of the first external tooth portion 14b by 2i.

The decelerating internal gear 18-A is connected to the driven device using a bolt B5. In the decelerating internal gear 18-A, a female hole 18e into which the bolt B5 is screwed is formed.

In the present embodiment, the counter input-side bearing housing 22-B is configured of a portion of the same member as that of the decelerating internal gear 18-A, and the counter input-side bearing housing 22-B and the decelerating internal gear 18-A are integrated with each other. This means that the decelerating internal gear 18-A also functions as the counter input-side bearing housing 22. The bearing 26 is disposed between the decelerating internal gear 18-A also functioning the counter input-side bearing housing 22 and the counter input-side shaft portion 12d of the wave generator 12.

An operation of the above-described gear device 10 will be described.

If the drive shaft of the drive device rotates, the wave generator 12 rotates together with the drive shaft. If the wave generator 12 rotates, the external gear 14 is bent and deformed continuously to match the shape of the intermediate shaft portion 12b of the wave generator 12 while changing the meshing position with the decelerating internal gear 18-A in the circumferential direction. If the wave generator 12 rotates, a relative rotation corresponding to a difference in the number of teeth between the first external tooth portion 14b of the external gear 14 and the first internal tooth portion 18a of the decelerating internal gear 18-A is generated in the external gear 14 and the decelerating internal gear 18-A. In the present embodiment, the external gear 14 is fixed to the external member using the bolt B2. Accordingly, the decelerating internal gear 18-A rotates with respect to the external gear 14 by the rotation of the wave generator 12, and the rotation of the decelerating internal gear 18-A is output to the driven device. In this case, the rotation of the wave generator 12 is decelerated by the reduction ratio corresponding to the difference in the number of teeth between the external gear 14 and the internal gear 18, and the decelerated rotation is output. As a result, the rotation of the wave generator 12 is decelerated and is output from the decelerating internal gear 18-A to the driven device.

Here, in the gear device 10 of the present embodiment, the external gear 14 is formed of the resin for gear, and the decelerating internal gear 18-A is formed of a metal as the high thermal conductivity material. In addition, the support member 20 configures a portion of the single member as that of the decelerating internal gear 18-A, and thus, similarly to the decelerating internal gear 18-A, the support member 20 is formed of the resin for gear.

Except for the above-described matters, the combination of the resin for gear and the high thermal conductivity material is similar to that of the third embodiment. That is, the wave generator 12, the first outer ring 16c of the wave generator bearing 16, the input-side bearing housing 22-A, and the third outer ring 26c and the third inner ring 26b of the bearing 26 are formed of a resin. The first rolling bodies 16a of the wave generator bearing 16, the second rolling bodies 24a of the main bearing 24, and the third rolling bodies 26a of the bearing 26 are formed of a metal. The bolt B1 is formed of a metal as the high thermal conductivity material.

In the above-described gear device 10, one of the external gear 14 and the internal gear 18 is formed of the resin for gear, and the other thereof is formed of the high thermal conductivity material. Accordingly, similarly to other embodiments, one of the external gear 14 and the internal gear 18 is formed of the resin for gear, and thus, it is possible to take a countermeasure with respect to heat generation in the gear while achieving weight reduction.

In addition, in general, the support member 20 disposed on the outer peripheral side of the decelerating internal gear 18-A tends to have a volume larger than that of the decelerating internal gear 18-A. In the present embodiment, the support member 20 and the external gear 14 are formed of the resin for gear. Accordingly, compared to a case where the support member 20 is formed of a metal, it is possible to effectively achieve the weight reduction.

In the present embodiment, the rotation of the wave generator 12 is decelerated by using only one decelerating internal gear 18-A without using the output internal gear 18-B and the decelerated rotation is output. Compared to a case where the output internal gear 18-B is used, the number of the meshing locations between the internal gear 18 and the external gear 14 decreases. Accordingly, compared to the case where the output internal gear 18-B is used, the number of the locations of heat generation in the gear decreases, and thus, an increase in the temperature of the internal gear 18 or the external gear 14 is not easily generated. Therefore, thermal deterioration of the external gear 14 or the internal gear 18 is not easily generated, and thus, it is possible to prevent the decrease in the life-span of the internal gear 18 or the external gear 14 caused by the thermal deterioration.

In addition, in the present embodiment, the example is described in which the decelerating internal gear 18-A is connected to the driven device and the support member 20 integrated with the external gear 14 is fixed to the external member. The decelerating internal gear 18-A may be fixed to the external member and the support member 20 integrated with the external gear 14 may be fixed to the driven device. In this case, when the wave generator 12 rotates, the rotation of the wave generator 12 is decelerated by the external gear 14 and the decelerating internal gear 18-A, and thus, the decelerated rotation is output to the driven device through the external gear 14 or the support member 20.

Sixth Embodiment

Figure 6:
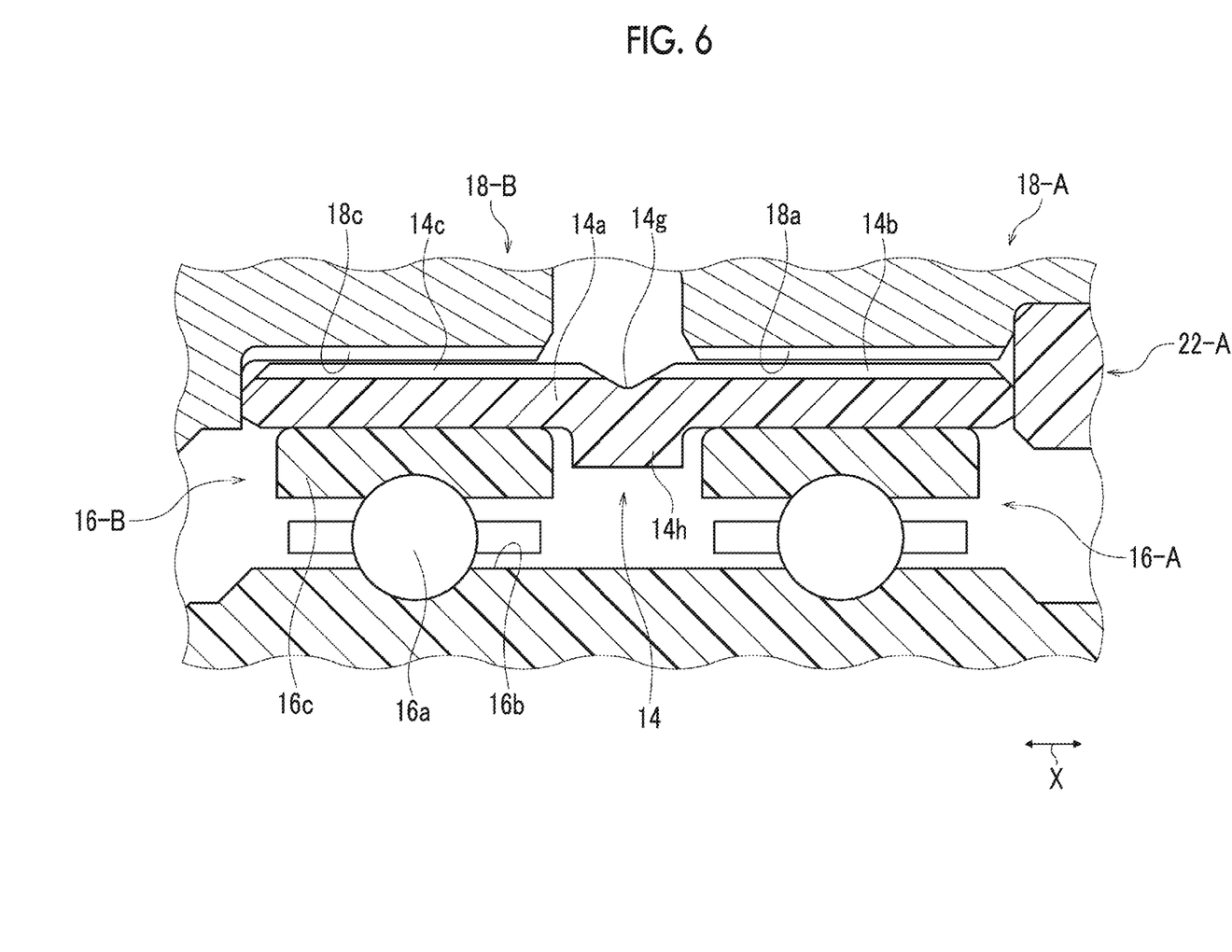
FIG. 6 is a partially enlarged view showing a gear device of a sixth embodiment.

FIG. 6 is a partially enlarged view showing a gear device 10 of a sixth embodiment. Compared to the gear device 10 of the fourth embodiment, in the gear device 10 of the present embodiment, mainly, the structure of the external gear 14 is different from that of the fourth embodiment.

Similarly to the above-described embodiments, the external gear 14 includes the base portion 14a, the first external tooth portion 14b which meshes with the first internal gear 18, and the second external tooth portion 14c which meshes with the second internal gear 18. In addition, similarly to the fourth embodiment, in the present embodiment, the external gear 14 is formed of the resin for gear, and the wave generator 12, the first outer ring 16c of the wave generator bearing 16, the input-side bearing housing 22-A are formed of a resin. In addition, the decelerating internal gear 18-A, the output internal gear 18-B, and the first rolling bodies 16a of the wave generator bearing 16 are formed of a metal as the high thermal conductivity material.

When the first external tooth portion 14b and the second external tooth portion 14c of the external gear 14 mesh with the first internal gear 18 or the second internal gear 18, forces opposite to each other in the circumferential direction are applied to the first external tooth portion 14b and the second external tooth portion 14c. As a result, the tooth surfaces of the first external tooth portion 14b and the second external tooth portion 14c are likely to be twisted, and thus, a partial contact in which only a portion of the tooth surface strongly abuts the internal tooth portions 18a and 18c of the internal gear 18 is likely to occur.

As a countermeasure with respect to this, the external gear 14 includes a groove portion 14g which is provided between the first external tooth portion 14b and the second external tooth portion 14c. The groove portion 14g is provided so as to include a range in the radial direction from a tooth tip to a tooth bottom of each of the first external tooth portion 14b and the second external tooth portion 14c, and the first external tooth portion 14b and the second external tooth portion 14c are separated from each other in the axial direction X. Accordingly, in a case where the forces opposite to each other in the circumferential direction are applied to the first external tooth portion 14b and the second external tooth portion 14c, the influences of the forces hardly exert on each other, and thus, occurrence of the partial contact can be suppressed.

Here, the external gear 14 of the present embodiment includes a protruding portion 14h which is provided on the inner peripheral side of the external gear 14 radially inside the groove portion 14g. The protruding portion 14h protrudes inward radially from the base portion 14a. The protruding portion 14h is provided radially inside the groove portion 14g in a range over the entire length of the groove portion 14g in the axial direction X. That is, when viewed in a radial direction, the protruding portion 14h is disposed to overlap the groove portion 14g in the range over the entire length of the groove portion 14g. The protruding portion 14h is disposed between the first wave generator bearing 16-A and the second wave generator bearing 16-B.

Accordingly, a portion around the groove portion 14g of the external gear 14 can be reinforced by the protruding portion 14h and it is possible to improve strength against the twist of the portion around the groove portion 14g. In addition, the reinforcement can be achieved without increasing the size of the external gear 14 in the circumferential direction between the wave generator bearing 16 and the internal gear 18. Moreover, the reinforcement can be achieved using the space between the first wave generator bearing 16-A and the second wave generator bearing 16-B. In addition, the external gear 14 is formed of the resin for gear, and compared to a metal, the strength is not easily obtained. However, the strength can be secured by the protruding portion 14h.

Moreover, in the present embodiment, the case is described in which the external gear 14 having the protruding portion 14h is formed of the resin for gear. However, the external gear 14 having the protruding portion 14h may be formed of the high thermal conductivity material, specifically, a metal.

Hereinbefore, the embodiments of the present invention are described in detail. However, it should be understood that the invention is not limited to the above-described embodiment, but may be modified into various forms on the basis of the spirit of the invention. Additionally, the modifications are included in the scope of the invention. In addition, the hatching attached to the cross sections of the drawings does not limit materials of the hatched targets.

In components of the gear device 10, as long as one of the external gear 14 and the internal gear 18 is formed of a resin and the other thereof is formed of the high thermal conductivity material, the materials of other components are not particularly limited. For example, as the components other than the external gear 14 and the internal gear 18, there are the wave generator 12, the wave generator bearing 16, the main bearing 24, the bearing housing 22, and the bearing 26, the bolts B1 and B3. However, these may use any of the resin and the high thermal conductivity material regardless of the materials of the external gear 14 and the internal gear 18.

The type of the bending meshing type gear device is not particularly limited. A tubular bending meshing type gear device, a silk hat type bending meshing gear device, a cup type bending meshing gear device, or the like may be used.

The case in which the decelerating internal gear 18-A and the support member 20 configure a portion of a single member and are integrated with each other is described. In addition, the internal gear 18-A and the support member 20 may be provided as separate members and may be connected to each other so as to be integrated.

As the example of the abutment member, the bearing housing 22 is described. However, the specific example of the abutment member is not particularly limited as long as it abuts the external gear 14.

What is claimed is:

1. A bending meshing type gear device, comprising:
a wave generator;
an external gear which is bent and deformed by the wave generator;
an internal gear which meshes with the external gear;
a wave generator bearing which is disposed between the wave generator and the external gear; and
a bolt which connects the internal gear and a member other than the internal gear to each other,
wherein the internal gear is formed of a resin,
wherein the external gear is formed of a high thermal conductivity material having thermal conductivity higher than that of the resin,
wherein each of the wave generator and the wave generator bearing is formed of a high thermal conductivity material having thermal conductivity higher than that of the resin,
wherein the wave generator comprises an intermediate shaft portion having an elliptical outer peripheral shape in a cross section orthogonal to an axial direction,
wherein the wave generator bearing is disposed between an outer peripheral surface of the intermediate shaft portion and the external gear, and
wherein the bolt is formed of a high thermal conductivity material having thermal conductivity higher than that of the resin.

2. A bending meshing type gear device, comprising:
a wave generator;
an external gear which is bent and deformed by the wave generator; and
an internal gear which meshes with the external gear,
wherein one of the external gear and the internal gear is formed of a resin,
wherein the other of the external gear and the internal gear is formed of a high thermal conductivity material having thermal conductivity higher than that of the resin,
wherein the internal gear includes a first internal gear and a second internal gear, and
wherein the external gear includes a base portion, a first external tooth portion which meshes with the first internal gear, a second external tooth portion which meshes with the second internal gear, a groove portion which is provided between the first external tooth portion and the second external tooth portion, and a protruding portion which is provided on an inner peripheral side of the base portion radially inside the groove portion.

3. The bending meshing type gear device according to claim 1, further comprising:
an abutment member which is connected to the internal gear and abuts the external gear,
wherein the abutment member is formed of a high thermal conductivity material having thermal conductivity higher than that of the resin.

4. The bending meshing type gear device according to claim 1,
wherein the wave generator is formed of a metal as the high thermal conductivity material.

5. The bending meshing type gear device according to claim 1,
wherein the member is a bearing housing which supports the wave generator via an input bearing.

6. The bending meshing type gear device according to claim 5,
wherein the bearing housing is formed of a resin.

7. The bending meshing type gear device according to claim 1,
wherein the wave generator bearing comprises an outer ring, a rolling body, and an inner ring, and
wherein the outer ring, the rolling body, and the inner ring are formed of the high thermal conductivity material.

8. The bending meshing type gear device according to claim 7,
wherein the inner ring of the wave generator bearing is integrally formed with the wave generator.

9. The bending meshing type gear device according to claim 1,
wherein a portion of the wave generator is exposed to an external space of the bending meshing type gear device.

10. The bending meshing type gear device according to claim 9,
wherein an end surface of the wave generator in an axial direction is exposed to the external space of the bending meshing type gear device.

11. The bending meshing type gear device according to claim 1,
wherein the internal gear comprises a bolt hole into which the bolt is screwed.

12. The bending meshing type gear device according to claim 1,
wherein the member is formed of a resin.

13. The bending meshing type gear device according to claim 5,
wherein the internal gear comprises a first internal gear and a second internal gear which are formed of the resin,
wherein the input bearing comprises a first input bearing and a second input bearing,
wherein the member comprises a first bearing housing supporting the first input bearing and a second bearing housing supporting the second input bearing, and
wherein the bolt comprises a first bolt connecting the first internal gear to the first bearing housing and a second bolt connecting the second internal gear to the second bearing housing.

14. The bending meshing type gear device according to claim 1, further comprising:
a connecting portion which comprises an insertion hole for inserting a bolt to be connected to an external member,
wherein the connecting portion is integrally formed of the internal gear with a single material.

15. The bending meshing type gear device according to claim 1,
wherein the internal gear comprises a first internal gear and a second internal gear which are formed of the resin,
wherein the bending meshing type gear device further comprises a support member integrated with the first internal gear and a main bearing disposed on an inner periphery of the support member to support the second internal gear,
wherein the support member is formed of a resin, and
wherein the main bearing is formed of the high thermal conductivity material.

16. The bending meshing type gear device according to claim 1,
wherein the wave generator comprises an input-side shaft portion which is positioned on an input side from the intermediate shaft portion and a counter input-side shaft portion which is positioned on a counter input side from the intermediate shaft portion, wherein the bending meshing type gear device further comprises a first input bearing supporting the input-side shaft portion and a second input bearing supporting the counter input-side shaft portion, and wherein the first input bearing and the second input bearing are formed of a high thermal conductivity material having thermal conductivity higher than that of the resin.

17. The bending meshing type gear device according to claim 1, wherein the internal gear is connected to a driven device via a connecting bolt and comprises a female screw hole into which the connecting bolt is screwed.

* * * * *